(12) United States Patent
Smith

(10) Patent No.: US 6,807,273 B2
(45) Date of Patent: Oct. 19, 2004

(54) METHOD AND APPARATUS FOR BYPASSING THE COMMON CONTROL AND SWITCH MATRIX OF A DIGITAL SWITCHING SYSTEM FOR TELECOMMUNICATIONS NETWORKS

(76) Inventor: David Matthew Smith, 929 Westbrook Dr., Plano, TX (US) 75075

( * ) Notice: Subject to any disclaimer, the term of this patent is extended or adjusted under 35 U.S.C. 154(b) by 392 days.

(21) Appl. No.: 09/998,438

(22) Filed: Nov. 30, 2001

(65) Prior Publication Data

US 2003/0103614 A1 Jun. 5, 2003

(51) Int. Cl.[7] .................................................. H04M 3/00
(52) U.S. Cl. ...................................... 379/244; 379/244
(58) Field of Search ........................... 379/219, 220.01, 379/211.02, 244; 370/217

(56) References Cited

U.S. PATENT DOCUMENTS 5,903,372 A * 5/1999 Czerwiec ..................... 398/66

6,459,783 B1 * 10/2002 March et al. ............ 379/211.02

* cited by examiner

*Primary Examiner*—Ahmad F. Matar
*Assistant Examiner*—Quynh H. Nguyen
(74) *Attorney, Agent, or Firm*—Michael L. Diaz (57) ABSTRACT

A method for bypassing the common control and switch matrix of a class 5 digital switch, comprising providing a means to convert the signals and protocols used with the line/trunk frames associated with the class 5 digital switch to those used by the remote end of a DLC; providing network interfaces for one or more digital transmission facilities that make up the remote end of a DLC; and providing a means to couple the line/trunk frames with the switching system interface. A switching system interface comprising one or more network interfaces for terminating digital transmission facilities; one or more interfaces for coupling to line/trunk frames of a digital switch; a time-slot assignment means for connecting time slots of the digital transmission facilities to those of the line/trunk frames; and a call processing means for coordinating call setup and teardown between the DLC local terminal and the line/trunk frames, and for managing the time-slot assignment means to complete calls.

28 Claims, 9 Drawing Sheets

Fig. 1

Pior Art

METHOD AND APPARATUS FOR BYPASSING THE COMMON CONTROL AND SWITCH MATRIX OF A DIGITAL SWITCHING SYSTEM FOR TELECOMMUNICATIONS NETWORKS

TECHNICAL FIELD OF THE INVENTION

This invention relates generally to the field of telecommunications, particularly to digital switching systems used to route calls within telecommunication networks, and more particularly to a method for bypassing the common control and switch matrix of a digital switching system.

BACKGROUND

A class 5 central office comprises a building or room which houses a class 5 switching system, which operates to connect telephones and other devices used by end-user customers ("subscribers") to a telecommunications network such as the public switched telephone network ("PSTN"). A class 5 digital switch also converts the analog signals used by telephones, modems, FAX machines, and some PBX trunks, into the digital signals that are routed through a digital telecommunications network. The class 5 digital switch also provides special services for caller ID displays and message waiting lights for subscribers, and it processes and routes calls from digital PBX trunks, ISDN lines, and digital loop carriers ("DLC") to a telecommunications network.

The class 5 central office houses substantial amounts of both equipment and cabling that is designed for a service life measured in decades, because it is extremely difficult and expensive to undertake replacement. To illustrate the physical magnitude of the equipment and cabling, consider that for each telephone line connected directly to the class 5 switch, a pair of copper wires is routed from a subscriber's premises to the class 5 central office. Large installations have hundreds of thousands of such pairs of wires that must be organized, physically supported, and accessible for maintenance. Cables with hundreds of such pairs of wire typically enter the class 5 central office through an underground cable vault. The individual pairs of wire leave the cables and run along a main distribution frame ("MDF"), which provides connection points for test access and connecting to the switching system. The MDF in a large office may be hundreds of feet long to provide many thousands of necessary connection points. Other cables are routed from the connection points of the MDF to line/trunk frames in the class 5 digital switch, which contain the electronics to terminate each telephone line, convert analog signals to digital signals, monitor each line for on-hook and off-hook conditions, dialing, etc. In a similar fashion, other cables are routed from the line/trunk frames, through the MDF or other distribution frame, out of the class 5 office and to the interexchange and long distance networks, where calls are carried from one class 5 switch to another. There may a hundred or more line/trunk frames in a large office, representing an investment of millions of dollars.

Most of the physical plant of the class 5 central office consists of wire, distribution frames, and line/trunk frames. A much smaller portion of the physical plant is devoted to a switch matrix and a common control system. The switch matrix routes calls from one line to another line or trunk, depending on whether the call is to a number in the same central office or a different central office. The common control comprises, among other things, a stored program control system ("SPCS"), which performs call processing, manages the hardware and software of the switch matrix and the line/trunk frames, and manages various communications interfaces to external software systems such as for billing, surveillance, maintenance, and provisioning.

As mentioned previously, the class 5 switching system and its associated cable plant are physically large, expensive, and engineered to remain in service for decades. As mentioned before, replacing such a switching systems is extremely difficult and cost-prohibitive. For these reasons, most subscribers are connected to switching systems that were originally designed years ago, before the deregulation of telecommunications that has taken place around the world. Therefore, they are referred to as "legacy" switching systems.

The deregulation of telecommunications and the rise of the internet have engendered a number of important trends. One trend is the mergers and acquisitions between telephone companies, which leads to the problem of consolidating different networks. While the trunks that carry digital voice and data are inherently compatible with industry standards, consolidating the disparate billing, provisioning, and maintenance software systems that communicate with the SPCS of each class 5 digital switch has proven difficult and expensive. Furthermore, the hardware and software of switching systems are proprietary to each particular manufacturer; therefore, the presence of more than one vendor's switching equipment make it difficult to eliminate redundant costs in the consolidated network. For example, periodic software updates must be purchased for the SPCS of each brand of switching system in the consolidated carrier's network.

Another trend is competition. Competing telephone services, offered by cable television operators, electric utilities, and other competitive providers, often use switching equipment of much newer design that enables the competitive provider to more easily create diverse service packages to offer to customers of traditional telephone companies. The class 5 digital switches owned by incumbent telephone companies were designed for the era of the monopoly telephone company. Consequently, their stored program control systems are not very flexible. The incumbent telephone company is therefore not able to easily create new service packages, but must often wait for years for new features to be added to proprietary software by the manufacturer of the legacy class 5 switching system.

Another trend is toward networks that carry both voice calls and data over common transport based on connectionless access protocols such as asynchronous transfer mode ("ATM") and transport control protocol/internet protocol ("TCP/IP"), also referred to as "packet networks". Packet networks simplify the problem of carrying voice and data from region to region. Furthermore, routing calls over such a network permits the use of common routing hardware controlled by so-called "soft switches", which are not much more than computers running specialized software. "Media gateways"are packet switches that also convert the digital format of voice calls on trunks from legacy class 5 switches into the formats used in packet networks. However, merging traditional class 5 digital switches into a converged network poses problems similar to those of merging networks of different equipment, such as different maintenance, provisioning, and billing software systems. Furthermore, external software systems are necessary to convert the protocols used for setting up calls across ATM and TCP/IP networks back to the corresponding protocol used by the stored program control systems of legacy class 5 switches.

Moreover, subscribers are still connected through the legacy class 5 switch, and therefore the services and features available are limited to what is available in the SPCS of the legacy switch.

Another trend is the growth of modem calls, mainly for internet access. Legacy class 5 digital switches were designed for an average call duration of approximately three minutes. The capacities of the switch matrix and the interexchange trunks were engineered by this standard. In other words, the switch matrix and the interexchange trunks can handle simultaneous calls to or from a certain fraction of the attached lines, that fraction having first been determined before the internet. With large numbers of internet modem calls that average 30 minutes or longer, these capacities are being strained. Expanding the trunk and matrix capacities of a legacy class 5 switch is very expensive.

In addition, the long service life of legacy class 5 digital switches is causing problems of maintenance. As the older legacy equipment ages, it is increasingly difficult to find technicians sufficiently knowledgeable to maintain the legacy equipment, and spare parts are becoming increasingly difficult to find. Third party manufacturers can be found who will supply spare line and trunk modules, which tend to be simpler than other modules and are available second-hand in greater numbers. The much lower volume of common control and switch matrix modules, however, combined with their greater complexity, makes them much less attractive to third party manufacturers. Furthermore, the software that operates in legacy stored program control systems may no longer be supported by its original manufacturer.

It can be seen that most of the limitations of legacy class 5 digital switches are associated with the SPCS and switch matrix, which represent a small part of the physical plant of a central office. On the other hand, the massive physical plant associated with line/trunk frames performs a job that continues to be needed in support of millions of miles of wire that already connects subscribers, through their existing telephones, modems, FAX machines, and PBX's, with the central office. The problem is that the line/trunk frames are designed to work only with the common control and switch matrix of the same manufacture, thereby preventing another class 5 switch or media gateway from being used to overcome the limitations of the common control and switch matrix.

What is needed is a means to bypass the common control and switch matrix of a legacy class 5 switching system in a way that permits any other switching system or media gateway to perform the associated functions, so that the legacy software may be discarded and/or any limitations of the legacy switch matrix may be overcome, while retaining the legacy line/trunk frames and cable plant and incurring minimal changes to the overall physical plant of the legacy class 5 central office.

A Digital Loop Carrier ("DLC") is an architecture and protocol that defines a means of providing analog and digital lines and trunks at a location remote to the class 5 switching system, using digital transmission facilities from the central office to the remote location, such as high-speed fiber optic facilities. The equipment comprising the remote end of the DLC architecture is called the "remote terminal", while the equipment comprising the end local to the class 5 switching system is called the "local terminal" or the "central office terminal". The DLC concept was created to provision telephone service to concentrations of subscribers thousands of feet from a central office, without the expense of running a pair of wires for each end user across the entire distance.

At least two industry standards have been developed that govern digital loop carrier architectures and protocols. In particular, there is the architecture and associated protocol documented by Telcordia Technologies, Inc. (formerly Bellcore) in their document GR-303-CORE ("GR303"), which is hereby incorporated by reference. All modern class 5 switches and media gateways are able to operate as local terminals in GR303 DLC's.

Therefore, what is needed is a method of bypassing the common control and switch matrix of a first class 5 digital switch, by providing a switching system interface which couples one or more line/trunk frames of the first digital switch to one or more digital transmission facilities that make up the remote end of a DLC, where the local terminal is a second class 5 digital switch or media gateway.

What is further needed is to equip such a switching system interface with the means to intercept end user calls dialed to known Internet Service Providers ("ISPs") and divert said calls to trunks dedicated to internet traffic.

It is, therefore, an object of the invention to provide such a method and such a switching system interface.

OBJECTS AND SUMMARY

It is a primary object of this invention to provide a method of bypassing the common control and switch matrix of a class 5 digital switch, so that their limitations may be overcome while retaining the large investment in line/trunk frames and cable plant.

It is a further object to provide a means of coupling the line/trunk frames of a first class 5 digital switch to one or more industry standard digital transmission facilities that make up the remote end of an industry standard DLC architecture, so that the line/trunk frames associated with the first digital switch may be operated by a local terminal which may be a second class 5 digital switch or media gateway of any manufacture.

It is a further object of this invention to permit the software operating on the stored program control system of said first class 5 digital switch to be discarded.

It is a further object of this invention to permit most or all of the hardware of the common control and switch matrix associated with said first class 5 digital switch to be decommissioned.

It is a further object of this invention to provide the ability to intercept calls dialed to any one of a list of known ISPs to be intercepted and diverted to trunks dedicated for internet traffic, thus relieving the host switching system or media gateway of a significant portion of internet traffic.

In accordance with the present invention, a method comprises accessing the proprietary signals of a digital switching system that communicate between the line/trunk frames and the common-control-and-switch matrix; providing a switching system interface comprising interfaces compatible with the proprietary signals and also comprising at least one network interface connected to the remote end of a corresponding digital transmission facility of a DLC architecture; and connecting the compatible interfaces to the proprietary signals.

Also in accordance with the present invention, a switching system interface comprises one or more network interfaces for terminating digital transmission facilities; one or more interfaces for coupling to line/trunk frames; a time-slot assignment means for connecting time slots of the digital transmission facilities to those of the line/trunk frames; and a call processing means for coordinating call setup and teardown between the DLC host and the line/trunk frames, and for managing the time-slot assignment means to complete calls.

DETAILED DESCRIPTION

Figure 1:
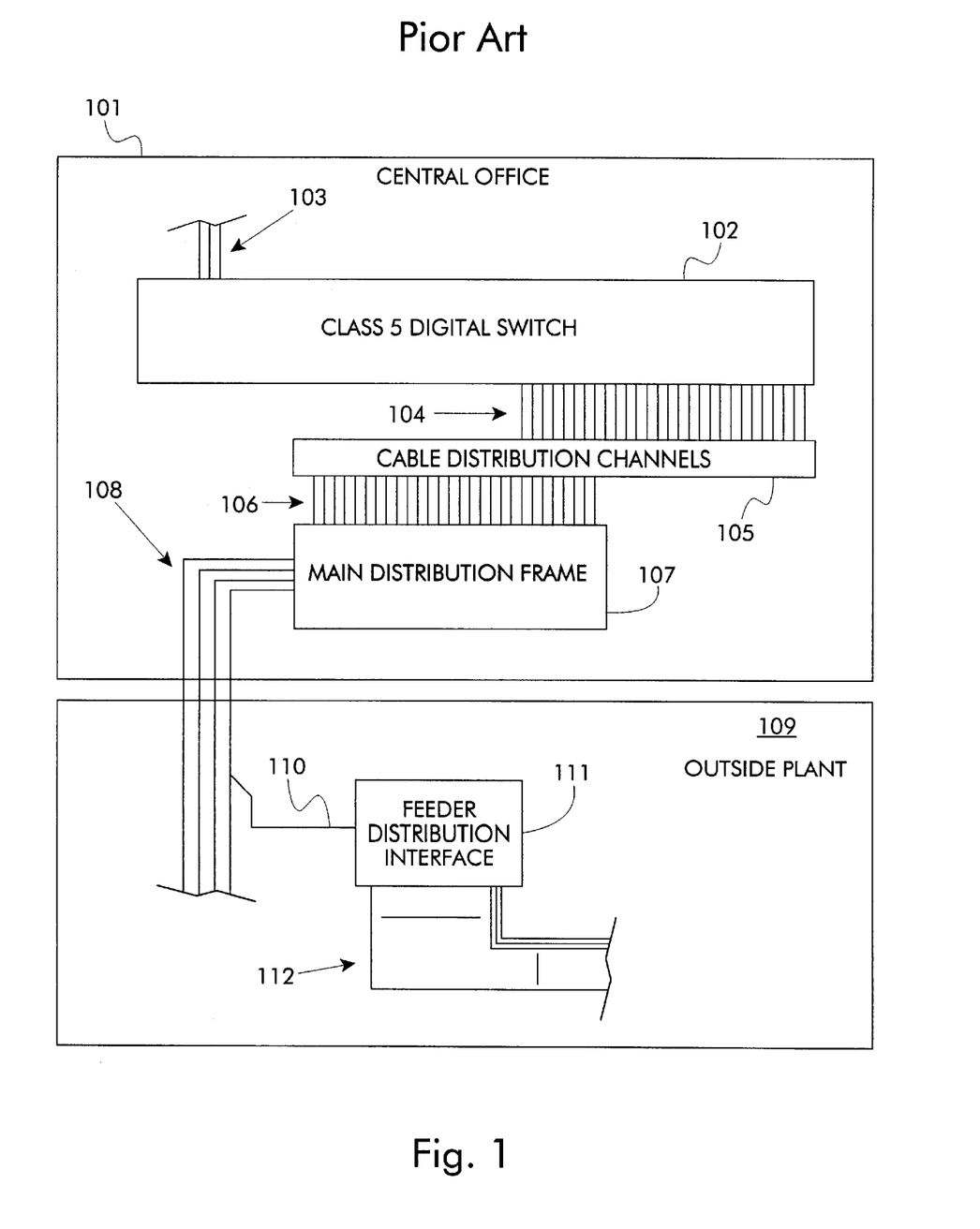
FIG. 1 illustrates an access/trunk cable plant from a prior art class 5 switching system within a central office to the subscribers external to the central office.
Figure 2:
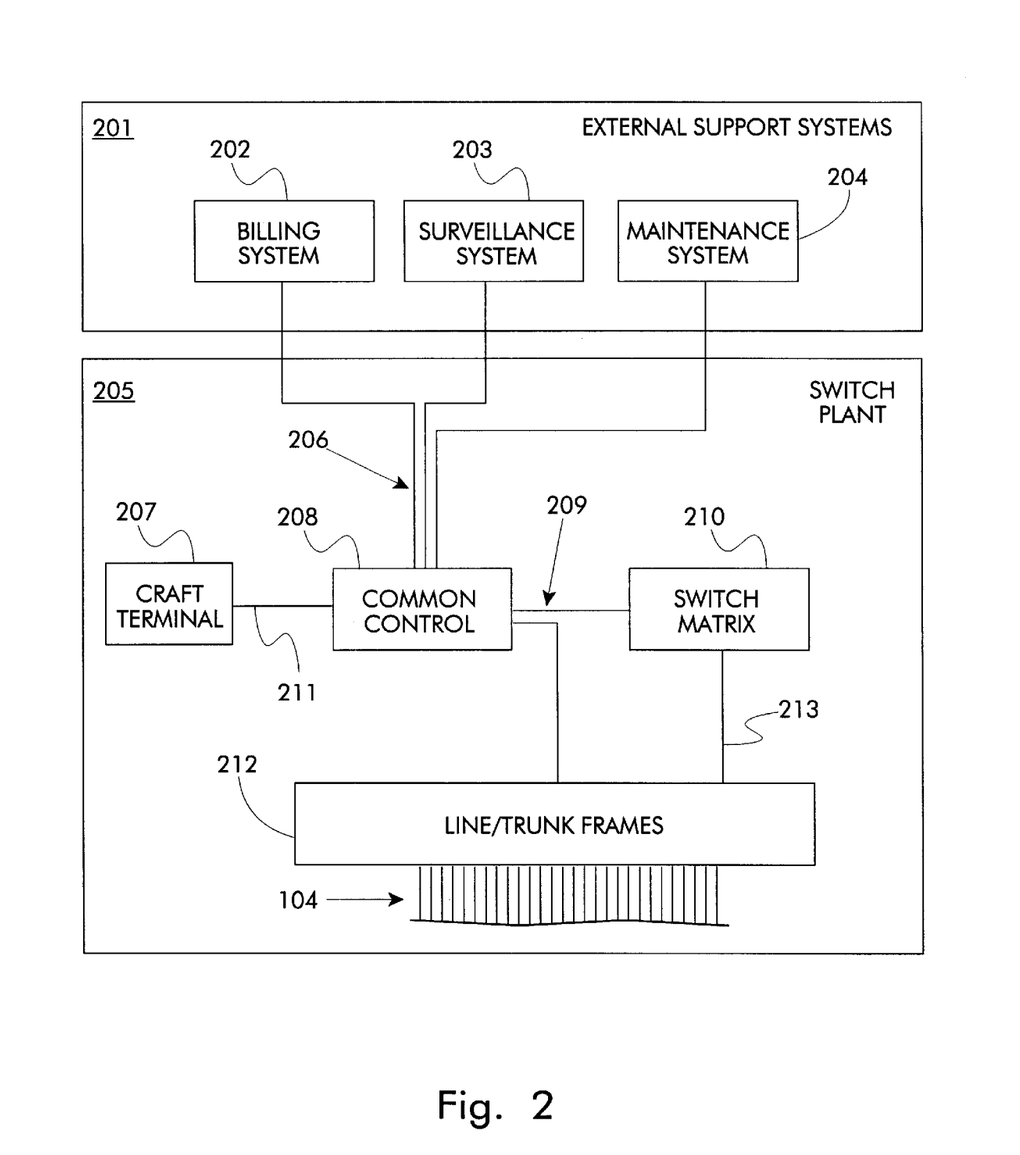
FIG. 2 illustrates groups of equipment frames and their interconnecting cables of a prior art class 5 switching system.

The method and apparatus of the present invention will be more easily understood after a brief review of the arrangement of a prior art class 5 digital switch and its various interconnections with subscribers, trunks, and support systems. FIGS. 1 and 2 are provided for this purpose.

FIG. 1 illustrates schematically a typical class 5 central office and its associated outside cable plant. A central office 101 comprises, among other things, a prior art class 5 switching system 102 and a main distribution frame 107. The class 5 switching system 102 comprises, among other things, a multiplicity of line/trunk equipment frames containing analog and digital interfaces (line/trunk interfaces) to lines and trunks, and one or more communications links 103 for external support systems, such as for provisioning, surveillance, billing, maintenance, etc.

A multiplicity of cables 104 leave the line/trunk equipment frames of class 5 switching system 102 and is carried through the office by means of one or more horizontal cable ladders and vertical risers collectively shown as cable distribution channels 105. A multiplicity of cables 106 are those cables carried by cable distribution channels 105 to a main distribution frame 107.

The main distribution frame 107 interconnects the multiplicity of cables 106 with a multiplicity of feeder cables 108 which in turn exit the central office 101. The main distribution frame 107 contains arrangements for easily connecting and reconnecting the multiplicity of cables 106 to 108 as necessary.

The multiplicity of feeder cables 108 travel under the streets or on poles. At various points, a branch feeder cable 110 leaves the main feeder cables 107. Branch feeder cable 110 typically enters a feeder distribution interface 111 at some point, which provides interconnection to a one or more distribution cables 112, in a manner analogous to the main distribution frame 107. The distribution cables 112 contain pairs of wire that run along poles or underground and connect to subscriber telephones, business Private Branch Exchanges ("PBXs"), interexchange trunks, and other parts of the network.

The multiplicity of feeder cables 108, branch feeder cables 110, feeder distribution interfaces 111 and distribution cables 112 are often collectively referred to as outside plant ("OSP").

It should be understood that FIG. 1 illustrates only an example of a class 5 central office and its outside plant, and many variations are possible. For instance, digital trunk cabling is sometimes routed separately from analog line/trunk cabling through an Office Repeater Bay ("ORB"), instead of the MDF. However, such variations are completely consistent with the present invention.

FIG. 2 illustrates schematically the interconnections among groups of equipment frames that make up the prior art class 5 switching system 102 of FIG. 1. Collectively, the groups of equipment frames and interconnecting cable that make up prior art class 5 switching system 102 are shown in FIG. 2 as switch plant 205. A group of one or more line/trunk frames 212 contains electronic modules that interface between various lines and trunks, such as analog two-wire and four-wire and digital four-wire, and the pulse code modulation ("PCM") busses that carry digital representations of voice and data. A multiplicity of cables 104 carries the analog and digital line/trunk signals away from the line/trunk frames, as in FIG. 1. One or more PCM cables 213 carry PCM busses between the analog line/trunk frames 212 and a group of one or more switch matrix frames 210.

A group of one or more common control frames 208 send control signals and/or messages, and receive status signals and/or messages, along management cables 209, to and from switch matrix frames 210 and line/trunk frames 212. Craft terminal 207 is a communications terminal such as a personal computer used by technicians to issue commands to, and receive messages from, common control 208, via communications link 211.

Additional communications links 206 provide communications between common control 208 and external support systems 201, which are typically software systems such as billing system 202, network surveillance system 203, and a combination of software and hardware such as maintenance system 204.

It should be understood that FIG. 2 illustrates only an example switch plant and external support systems. Many variations are possible, but it will be understood that such variations do not affect the method of the present invention.

Figure 3:
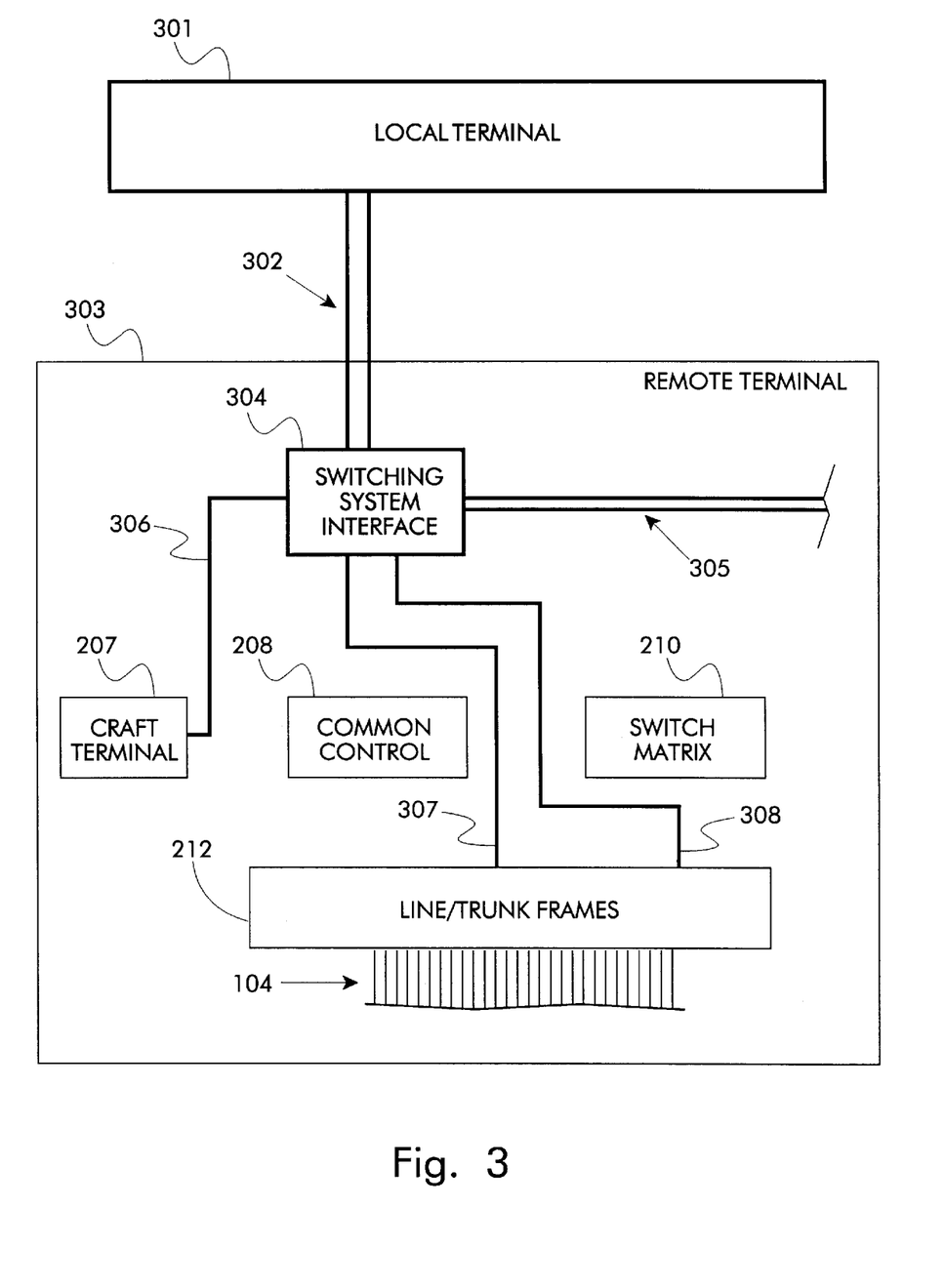
FIG. 3 illustrates a method by which the present invention replaces the common control and switching matrix equipment frames of a prior art class 5 switching system.

One embodiment of the method of the present invention is illustrated schematically in FIG. 3. In this method the stored program control system 208 and switch matrix 210 of FIG. 2 are disconnected and replaced by switching system interface 304. Communications link 211 is replaced by communication link 306. Craft terminal 207 may be reused, or may be replaced by a more suitable device. PCM cables 213 are replaced by PCM cables 308, which carry PCM between line/trunk frames 212 and switching system interface 304. A subset of management cables 209 used for managing line/trunk frames 212 are replaced by management cables 307, which carry management signals between the line/trunk frames and the switching system interface.

A local terminal 301, typically comprising a class 5 digital switch or media gateway, resides either in another office (possibly in another city), or even in the same office, and couples to switching system interface 304 by means of one or more digital transmission facilities 302. Remote terminal 303 of the DLC architecture comprises line/trunk frames 212 and switching system interface 304. Optional internet-dedicated trunks 305 carry intercepted internet traffic that is diverted away from local terminal 301.

Figure 4:
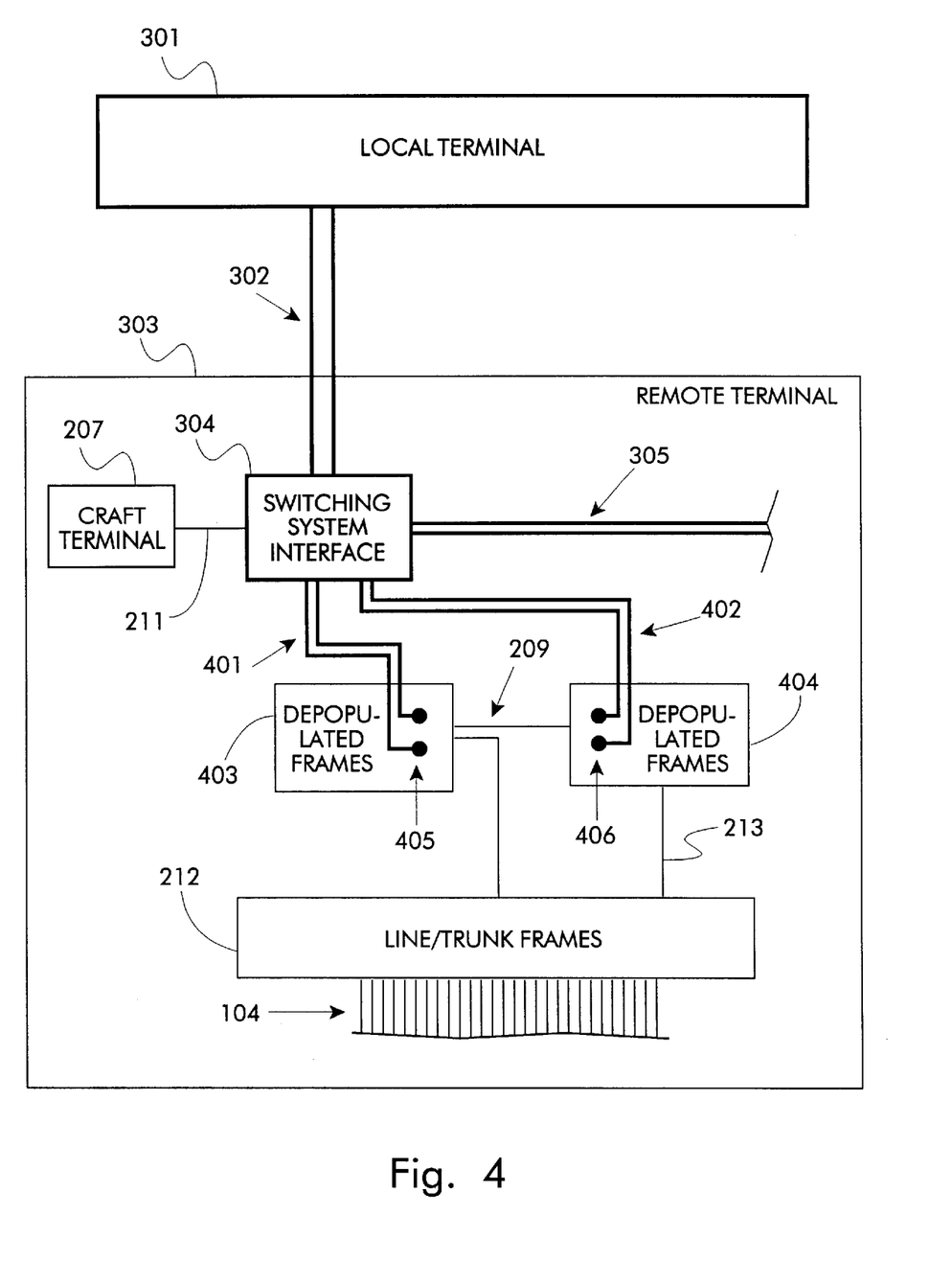
FIG. 4 illustrates a preferred embodiment of the method of the present invention for replacing common control and switching matrix equipment frames of a prior art class 5 switching system.

A preferred embodiment of the method of the present invention is illustrated schematically in FIG. 4. In this embodiment, the management cables 209 and PCM cables 213 of FIG. 2 are left in place. Certain prior art electronic circuit modules are unplugged from common control 208 of FIG. 2, leaving one or more depopulated frames 403. Similarly, certain prior art electronic circuit modules are removed from switch matrix 210 of FIG. 2, leaving one or more depopulated frames 404. Although one or more removable prior art circuit modules have thus been unplugged from depopulated frames 403 and 404, connectors and internal wiring associated with administrative cables 209 and PCM cables 213 are still in place. In order to access this internal wiring, one or more specialized circuit modules 405 and 406 are installed in depopulated frames 403 and 404, in place of the removed prior art modules. Cable sets 401 and 402 connect specialized circuit modules 405 and 406 to switching system interface 304. Thus, switching system interface 304 accesses to all necessary busses and signals in order to manage line/trunk frames 212 and carry PCM data to and from these frames, while the potentially complex and/or old and fragile cabling associated with the various groups of equipment frames from the prior art class 5 switching system have been left intact and not disturbed.

It will be understood by one skilled in the art that certain class 5 digital switches utilize "concentration" between the switch matrix and the line/trunk interface modules, whereby fewer PCM timeslots are carried into the switch matrix than there are line/trunk circuits. The reason for this to reduce the size of the switch matrix, considering that only a fraction of subscribers will make or receive calls at any given time. Therefore, in a variation of this embodiment of the method of the present invention, specialized circuit modules 406 replace certain prior art circuit modules in line/trunk frames 212, that are associated with concentration, giving switching system interface 304 access to all circuits in the line/trunk frames, without the limitation of concentration.

As in FIG. 3, remote terminal 303 comprises the collection of line/trunk frames 212 and switching system interface 304. Also as in FIG. 3, optional internet-dedicated trunks 305 carry intercepted internet traffic that is diverted away from local terminal 301.

Redundancy is a common architectural technique for achieving fault tolerance in telecommunications equipment. It is a general practice in the industry that no single point of failure should disrupt more service than the equivalent of 24 telephone calls. Many of the systems that make up a digital switching system, such as the SPCS, switch matrix, and PCM cables, are designed with redundant component modules. This practice prevents a failure in one component module from disrupting service to dozens or hundreds of subscribers. Redundancy has also been exploited in the industry to replace component modules, one at a time, for the purpose of adding new features or replacing obsolete component modules, without disrupting service. When there are redundant subsystems for performing the same function, each subsystem is sometimes referred to as a "plane", and two redundant planes are thus referred to as "A-plane" and "B-plane".

Figure 5:
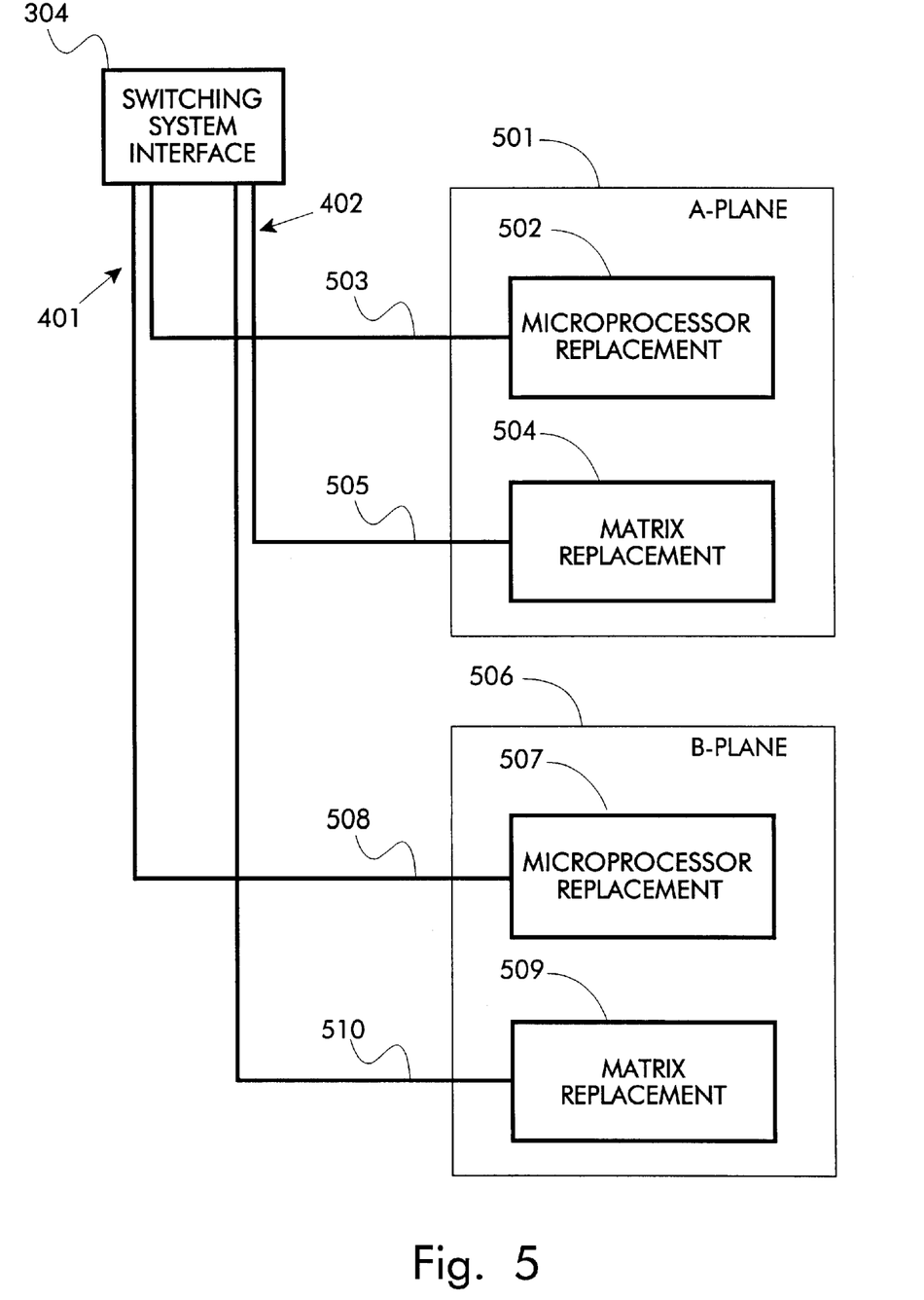
FIG. 5 illustrates a preferred embodiment of the switching system interface of the present invention.

A coupling arrangement of the present embodiment, between switching system interface 304 and depopulated frames 403 and 404, is illustrated schematically in FIG. 5. The specialized circuit modules 405 and 406 are grouped logically into redundant planes 501 and 506. Specialized circuit modules 405 of FIG. 4 comprise A-plane microprocessor replacement 502 and B-plane microprocessor replacement 507 of FIG. 5. Similarly, specialized circuit modules 406 of FIG. 4 comprise A-plane matrix replacement module 504 and B-plane matrix replacement module 509 of FIG. 5. Cable set 401 of FIG. 4 comprises A-plane control cable set 503 and B-plane control cable set 508 of FIG. 5. Similarly, PCM cable set 402 of FIG. 4 comprises A-plane PCM cable set 505 and B-plane PCM cable set 510 of FIG. 5. Cable sets 503, 505, 508, and 510 are preferably fiber optic in nature. It should be understood that the exact number and type of specialized circuit modules is dependent on the make and model of prior art class 5 switching system 102 of FIG. 1.

It will be seen by one skilled in the art that the logical grouping of specialized circuit modules into A-plane 501 and B-plane 506 follows the corresponding grouping of subsystems contained in prior art class 5 switching system 102 of FIG. 1, and that this enables the method of the present invention to be accomplished with minimal or no disruption to on-going service to subscribers. Suppose, for example, that switching system interface 304 is already installed and coupled to local terminal 301. Suppose that prior art class 5 switching system 102 is commanded to operate all services exclusively on its A-plane subsystems. Such a command or group of commands might be entered by a technician into craft terminal 207 of FIG. 2. After verifying the successful completion of this command or group of commands, the technician would then enter a group of commands to change the service state of all B-plane common control and switch matrix circuit modules to out of service ("OOS"). The OOS service state prevents the SPCS from autonomously switching to any B-plane circuit modules. The technician now physically removes one or more B-plane circuit modules, as necessary, installs the corresponding specialized circuit modules 507 and 509 comprising B-plane 506, and installs cable sets 505 and 510. The technician now commands line/trunk frames 212 to change operation over to B-plane, which causes service to be carried through switching system interface 304 and thus through local terminal 301. After all service is successfully moved to B-plane, the technician removes necessary A-plane circuit modules from prior art class 5 switching system 102, installs the corresponding specialized circuit modules 502 and 504 comprising A-plane 501, and installs cable sets 503 and 508. Now redundancy is available through switching system interface 304, and the common control and switch matrix of prior art class 5 switching system 102 have been completely bypassed. It should be understood that there are many details to this procedure that have not been described here, and that depend to an extent on the make and model of prior art class 5 switching system 102.

Figure 6:
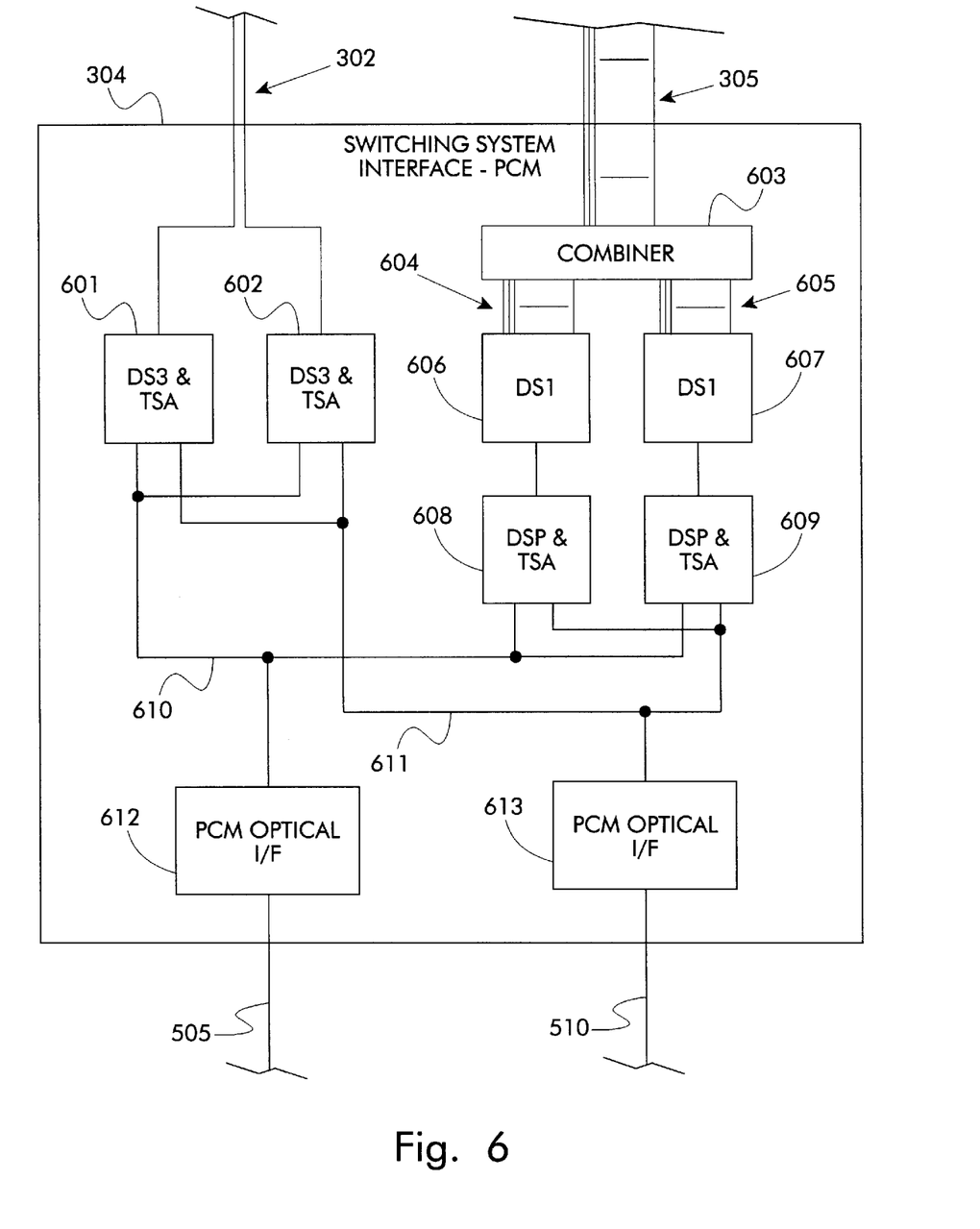
FIG. 6 illustrates the component modules of a preferred embodiment of the switching system interface of the present invention, that process and route pulse-code modulation signals.

FIG. 6 illustrates schematically the internal PCM flow of a version of the preferred embodiment of the switching system interface of the present invention. This version uses DS3's as digital transmission facilities to the local terminal, and DS1's as dedicated internet trunks. It should be understood that each PCM path in FIG. 6 is a two-way path, where one direction is away from the line/trunk frames ("upstream"), and the other direction is toward the line/trunk frames ("downstream").

One or more A-plane PCM optical interfaces 612 are coupled to corresponding A-plane matrix replacement modules (504 of FIG. 5), via cable set 505. PCM interfaces 612 also couple to an internal PCM bus 610. Similarly, one or more B-plane PCM optical interfaces 613 are coupled to corresponding B-plane matrix replacement modules (509 of FIG. 5), via cable set 510. B-plane PCM optical interfaces 613 also couple to B-plane internal PCM bus 611. Thus, each circuit of the associated line/trunk frames has a time slot assigned in the upstream and the downstream directions of PCM busses 610 and 611.

In this embodiment, digital transmission facilities 302 of FIG. 3 comprise redundant DS3 facilities terminating on A-plane DS3 module 601 and B-plane DS3 module 602. It will be understood by one skilled in the art that an external facility failure, such as a broken cable, should not result in a loss of redundancy within switching system interface 304 or in a loss of redundancy downstream, such as optical fibers 505 and 510. Consequently, each DS3 module 601 and 602 is coupled to each redundant PCM bus 610 and 611. It will also be understood by one skilled in the art that it is efficient and economical if each DS3 module 601 and 602 further comprises a time-slot assignment means as part of its interface to PCM busses 610 and 611.

In this embodiment, digital transmission facilities 305 of FIG. 3 comprise one or more DS1 facilities terminating on A-plane DS1 module 606 and B-plane DS1 module 607. Each DS1 module 606 and 607 comprises a multiplicity of DS1s 604 and 605, which are coupled together through passive combiner 603 to provide a multiplicity of internet-dedicated trunks 305 of FIG. 3. It will be understood by one skilled in the art that a multiplicity of DS1 facilities provides a measure of redundancy for external facilities, in that if one facility fails externally there is a reduction in capacity rather than an interruption of service. It will also be understood that DS1 modules 606 and 607 provide for redundancy within switching system interface 304, in that one module will handle all DS1 facilities in the event of a failure in the other module. This is the reason for passive combiner 603.

Redundant digital signal processor ("DSP") modules 608 and 609 provide the internet reroute capability mentioned above. Each DSP monitors DTMF digits that are dialed to initiate a call. If the digits correspond to a known ISP, the call is intercepted and routed through redundant DS1 modules 606 and 607. It will be understood by one skilled in the art that it is efficient and economical if each DSP module 608 and 609 further comprises a time-slot assignment means as part of its interface to PCM busses 610 and 611. It will be further seen by one skilled in the art that DSP modules 608 and 609 can be made capable of performing the functions of dial-up digital modems, and that DS1 modules 606 and 607 would then carry packets such as ATM cells instead of circuits, or could be replaced with industry-standard digital packet interfaces such as 100BaseT. This would be advantageous in an office containing one or more DSLAMs for DSL service, since the packetized traffic from the DSLAMs could be combined with the packetized traffic from intercepted dial-up internet calls.

Figure 7:
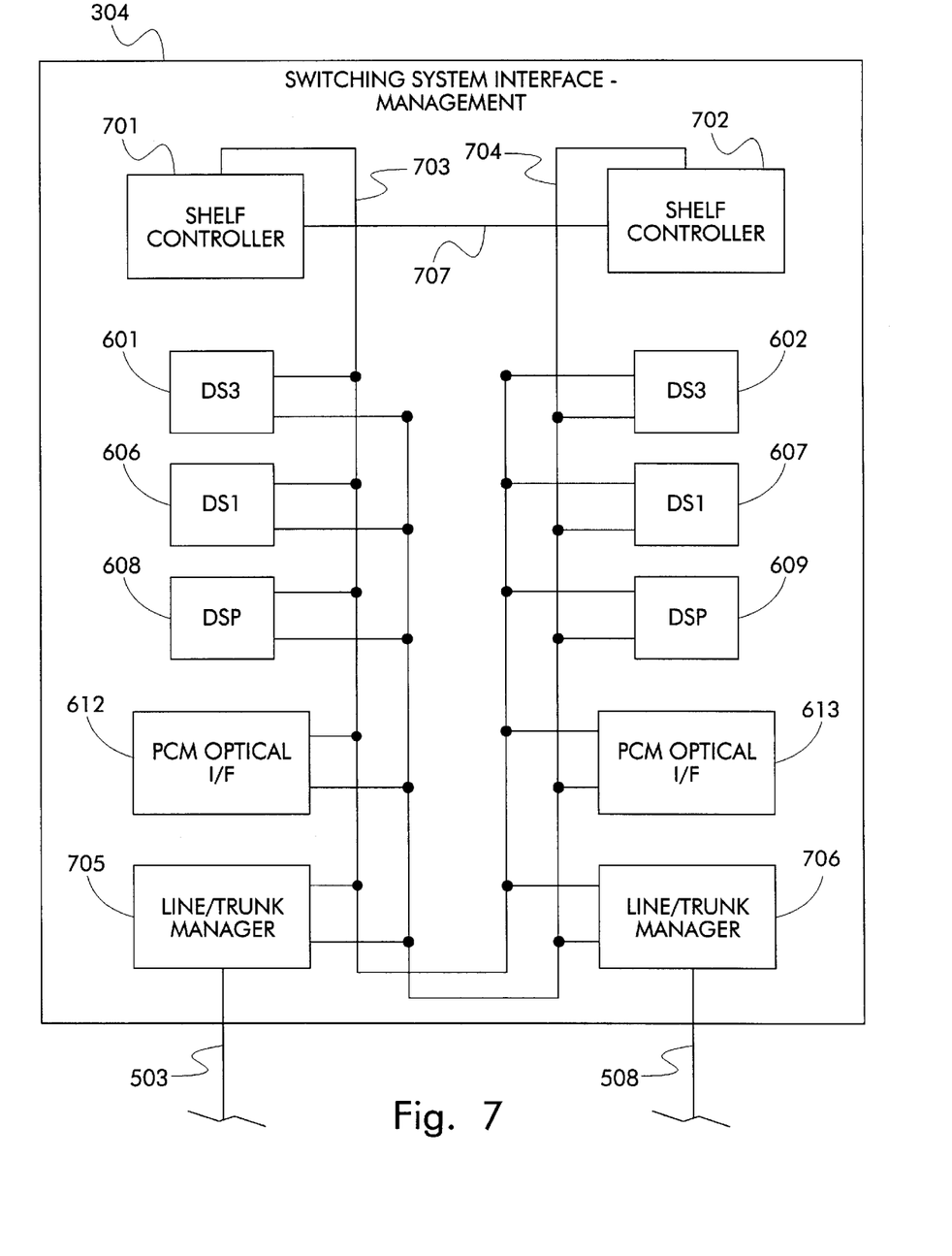
FIG. 7 illustrates the management connections between component modules of a preferred embodiment of the switching system interface of the present invention.

FIG. 7 illustrates schematically the management flow of the preferred embodiment. A-plane shelf controller module 701 is the architectural master of A-plane management bus 703. Similarly, B-plane shelf controller module 702 is the architectural master of B-plane management bus 704. All other modules in switching system interface 304 are subordinate to shelf controller modules 701 and 702, and each subordinate module has separate interfaces to the redundant management busses 703 and 704. Communication link 707 connects between redundant shelf controller modules 701 and 702 in order for them to coordinate which shelf controller is in control of all subordinate modules at any given time. One skilled in the art will appreciate that this use of redundant management busses is common practice, and will also appreciate that other variations are possible.

One or more A-plane line/trunk manager modules 705 are coupled by means of one or more fiber optic control cables 503 to one or more A-plane microprocessor replacement modules 502. In this way, A-plane line/trunk manager module 705 communicates with one or more control busses 209, as illustrated in FIG. 4, and then to all line/trunk frames. In a similar way, one or B-plane line/trunk manager modules also communicate will all line/trunk frames. In this way, redundant shelf controls 701 and 702 control all line trunk frames and receive status and alarm information.

Figure 8:
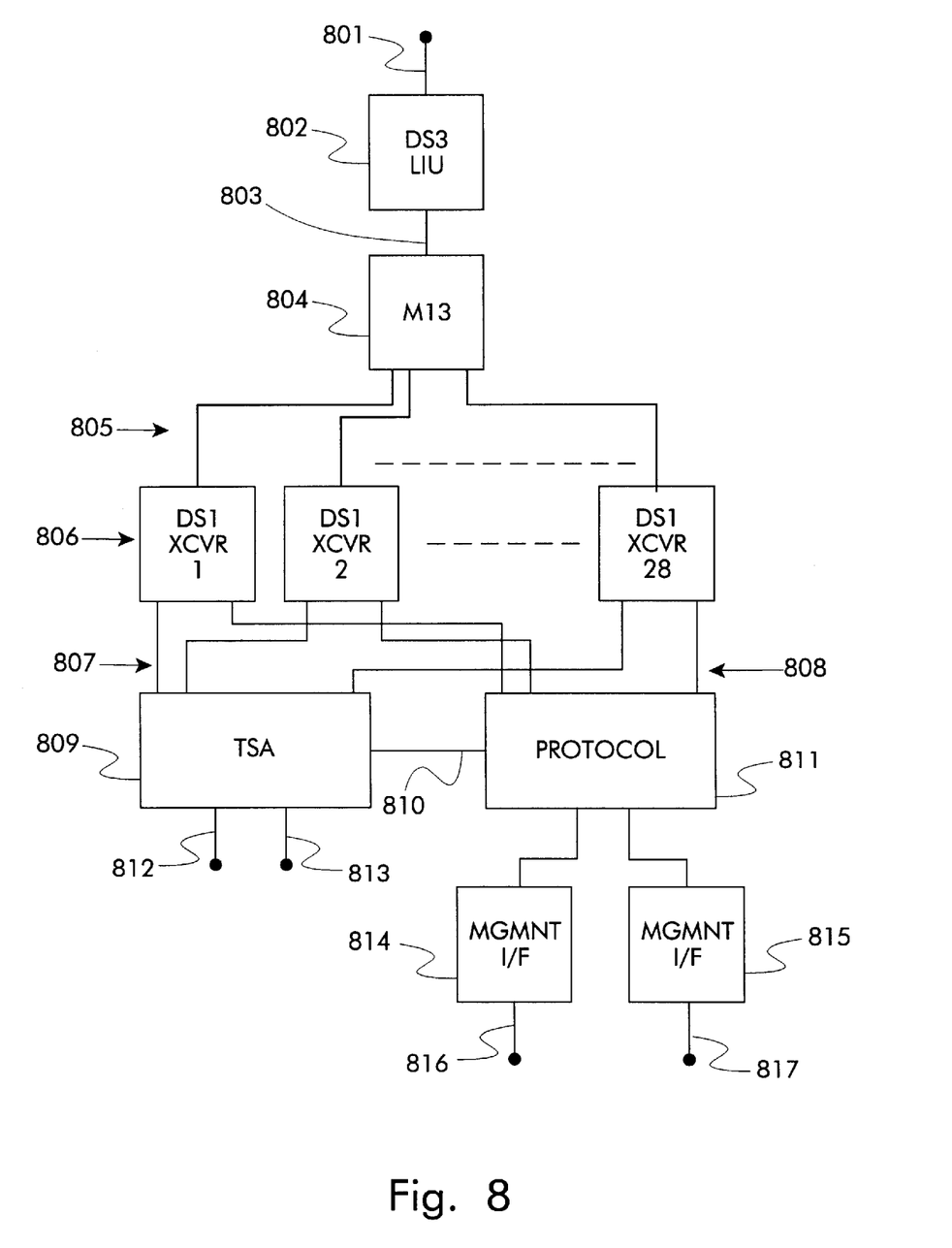
FIG. 8 illustrates schematically a preferred embodiment of a network interface that includes a time-slot assignment means.

FIG. 8 illustrates schematically the this embodiment of the electronic module that can perform as either DS3 module 601 and DS3 module 602. The processing of the DS3 signal is conventional, as follows: DS3 facility 801 is coupled to DS3 line interface unit 802, which terminates the DS3 line signal, extracts clock and data, and monitors for line quality. The clock and data are coupled in turn to M13 multiplexer 804, which terminates the DS3 framing patterns, translates the DS3 data into 28 DS1 signals and monitors for DS3 problems.

The 28 DS1s 805 are coupled to 28 DS1 transceivers 806, which terminate the DS1 framing pattern for each DS1, extract clock and data, and monitor for DS1 problems.

The 28 PCM streams 807 from DS1 transceivers 806 are coupled to time slot assignment means 809, which is programmed to map selected timeslots between the PCM streams and redundant PCM busses 610 and 611. The interface used for programming time slot assignment means 809 is not depicted, but is of the nature of a conventional parallel interface.

Connections 808 show the DS1 signaling, that is extract by the 28 DS1 transceivers 806, coupled to low-level protocol processor 811. Also, selected timeslots that serve special purposes in the DLC protocol, namely an embedded operations channel and a timeslot management channel, are selected by time slot assignment means 809 and coupled to low-level protocol processor 811 by means of PCM bus 810.

Low-level protocol processor 811 examines DS1 signaling from local terminal 301 (FIG. 4) and reports this to shelf controllers 701 and 702 via redundant management interfaces 814 and 815, which are connected in turn to redundant management busses 703 and 704 by means of connections 816 and 817.

It should be understood that the connections to the DS3 facility 801, the management bus connections 816 and 817, and sundry other connections such as for power, are completed when the module is inserted into its physical connector, as DS3 module 601 or 602. It will be understood by one skilled in the art that the various connections shown in FIG. 8, such as 801, 803, 805, and so on, are bi-directional, that is, data flow both upstream toward the local terminal and downstream toward the line/trunk frames. It will also be understood by one skilled in the art that certain common components of the DS3 module are not shown in FIG. 8, for example management interfaces into DS1 transceivers 806 for the purpose of setting DS1 options and reporting DS1 status. Such common components, while necessary for a complete module, are well understood in the industry.

Figure 9:
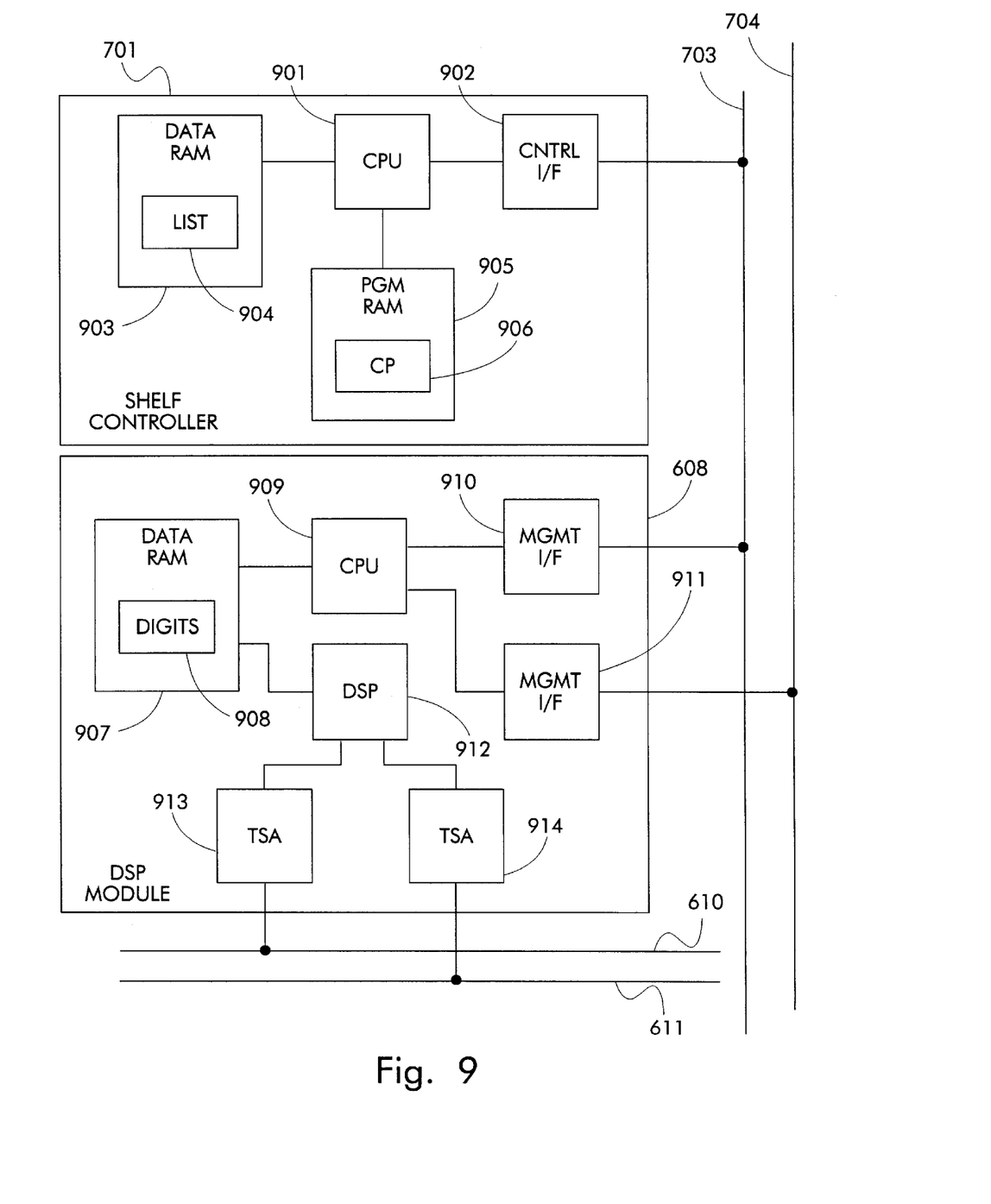
FIG. 9 illustrates schematically the component parts of a preferred embodiment of a shelf controller and a DSP module that are used to identify dial-up internet calls.

FIG. 9 illustrates schematically the components of shelf controller 701 and DSP module 608 that are used for identifying dial-up internet calls. It should be understood that shelf controller 701 is identical to shelf controller 702, since they are a redundant pair; likewise for DSP modules 608 and 609.

Shelf controller 701 comprises CPU section 901, further comprising a micro-processor and associated glue logic and buffers, data memory 903, program memory 905, and control interface 902. The contents of data memory 903 comprise various software-related data, as well as list 904, which is a list of predetermined internet service providers. The contents of program memory 905 comprises various management functions, as well as call processing means 906, which further comprises a means for comparing telephone numbers to the contents of list 904. It will be understood by one skilled in the art that the management functions comprise the conventional functions to manage hardware, communicate with a craft terminal, and other functions common to telecommunications equipment and well understood in the industry. It will also be understood by one skilled in the art that call processing means 906 comprises conventional algorithms for setting up and tearing down calls within a remote terminal, according to the industry standard GR-303-CORE, referenced earlier.

DSP module 608 comprises data memory 907, CPU section 909, redundant management interfaces 910 and 911, DSP section 912, and redundant time slot assignment means 913 and 914. CPU section 909 further comprises a microprocessor, glue logic, and a program memory. CPU section 909 communicates with shelf controller 701 via management interface 910 and management bus 703, and with shelf controller 702 via management interface 911 and management bus 704.

DSP section 912 comprises one or more digital signal processor circuits that are programmed to detect DTMF tones and hence digits using conventional discrete Fourier transform techniques. Redundant time slot assignment means 913 and 914 provide selected pulse-code modulation timeslots for processing by DSP section 912.

The contents of data memory 907 comprise digits 908 that are collected by DSP section 912 and reported to shelf controllers 701 and 702 by CPU section 909.

It will be understood by one skilled in the art that certain conventional hardware components are not shown in FIG. 9, an interface for CPU section 909 to program time slot assignment means 913 and 914 in order to select the timeslots to monitor for dialed digits. It will also be understood by one skilled in the art that there are various conventional functions performed by CPU section 909, such as accepting instructions via management interfaces 910 and 911 for programming the timeslot assignment means. It will also be understood by one skilled in the art that conventional modem signal processing algorithms may be programmed into DSP section 912 for converting the analog modem tones represented in one or more PCM timeslots into digital packets, and vice versa.

In the present embodiment, call processing means 906 receives digits from DSP module 608 or 609 and compares them with the numbers in list 904. If a match is found, call processing means sends a message via low-level protocol processor 811 (FIG. 8) to local terminal 301, indicating that the call has hung up. Call processing means 906 then instructs, via CPU section 909 of DSP module 608, DSP section 912 to apply a conventional modem signal processing algorithm to the timeslot associated with the dial-up internet call. DSP section 912 thus translates between a PCM representation of modem tones and digital packets. The digital packets are exchanged with an external packet router through DS1 module 606 or 607, as shown in FIG. 6.

It will be understood by one skilled in the art that various ancillary functions common to telecommunications equipment must be built into the switching system interface of the present invention. For example, synchronization signals must be distributed to all modules that carry PCM data as well as the line/trunk frames. As another example, electrical power must be distributed to all modules. It will be understood by one skilled in the art that the software executing in shelf controllers 701 and 702 will further comprise a surveillance means for monitoring the status and alarms of each module in the switching system interface, and in line/trunk frames 212. It will also be understood by one skilled in the art that the software further comprises various other means common to telecommunications equipment.

It will therefore be understood by one skilled in the art that the various functions performed by switching system interface 304 are conventional to common telecommunications equipment, such as DLC remote terminals; and that the improvement of the present invention is to perform these functions in order to bypass the common control and switch matrix of a digital switching system, while leaving intact and operational the line/trunk frames and cable plant of said switching system.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

I claim:

1. A method for bypassing the common control and switch matrix of a first class five digital switching system for telecommunications networks, said method comprising the steps of:

accessing internal signals of said first class five digital switching system used to control line and trunk interfaces of said first class five digital switching system and convey data in and out of said line and trunk interfaces;

providing a switching system interface comprising at least one network interface connected to at least one digital transmission facility that is part of a network architecture, and comprising interfaces compatible with said internal signals; and connecting said compatible interfaces of said switching system interface to said internal signals of said first class five digital switching system the connection between said compatible interfaces and said internal signals enabling a terminal in said network architecture to directly operate said internal signals to provide telecommunications service to subscribers connected to said line and trunk interfaces without the use of said common-control-and switch matrix of said first class five digital switching system.

2. The method of claim 1, further comprising the step of disconnecting at least one first cable of said first class five digital switching system that couples said line and trunk interfaces to said common control and switch matrix while maintaining at least one second cable of said first class five digital switching system that couples said internal signals to said common-control-and-switch matrix to maintain telecommunications service to subscribers while disconnecting the first cable.

3. The method of claim 1 wherein said architecture is described by the industry standard GR-303-CORE, whereby the model of said terminal can be chosen independently of the model of said first digital switching system.

4. The method of claim 1 wherein said network architecture is a digital loop carrier architecture and said terminal is a local terminal.

5. The method of claim 1 wherein said terminal of said network architecture is a media gateway.

6. The method of claim 1, further comprising the steps of:
removing at least one electronic module of said first class five digital switching system to access at least one of said internal signals; and
replacing said electronic module with an interface module connected to said switching system interface.

7. The method of claim 1 further comprising the steps of:
providing a means within said switching system interface for capturing telephone numbers dialed by subscribers connected to said line and trunk interfaces;
providing a memory for storing within said switching system interface a list of telephone numbers of known internet service providers;
providing a means within said switching system interface for comparing said telephone numbers dialed by said subscribers against said list in order to identify dial-up internet calls;
providing a means for coupling said switching system interface to facilities for handing internet traffic separate from voice calls; and
providing a means within said switching system interface for diverting said dial-up internet calls away from said terminal and into said facilities for handling internet traffic;
whereby said local terminal of said network architecture is relieved of the burden of carrying dial-up internet calls.

8. A switching system interface for bypassing the common control and switch matrix of a first class five digital switching system for telecommunications networks, comprising:
at least one network interface for terminating a digital transmission facility that is part of a network architecture;
at least one line/trunk interface, compatible with the internal signals used to operate said line/trunk interface of said first class five digital switching system; and
a switching means, connected to said network interface and to said line/trunk interface, for routing data between said network interfaces and said line/trunk interface.

9. The switching system interface of claim 8 wherein said switching means is a time-slot assignment means connected to said network interfaces and to said line/trunk interface for coupling certain timeslots between said network interfaces and said line/trunk interface.

10. The switching system interface of claim 8 further comprising:
one or more digital signal processing means, connected to said switching means, for capturing telephone numbers dialed by subscribers connected to said line/trunk interface;
a memory for storing a list of telephone numbers;
a means for comparing said captured telephone numbers against said stored list of telephone numbers;
one or more data-oriented network interfaces connected to said switching means;
whereby said switching system interface will identify dial-up internet calls placed by said subscribers to know internet service providers and divert said dial-up internet calls to said data-oriented network interfaces and prevent said dial-up internet calls from reaching said terminal of said network architecture and said terminal is relieved of said dial-up internet calls.

11. The method of claim 1 wherein the data and control signals are pulse-code modulation, timing and management signals.

12. The method of claim 4 wherein the local terminal is a second digital switching system.

13. The method of claim 1, further comprising the step of:
removing at least one cable originally connected between said common control and switch matrix of said first class five digital switching system to access at least one of said internal signals of said first digital switching system; and
replacing said cable with a cable connect to said switching system interface.

14. The switching system interface of claim 8 further comprising a low-level protocol termination means connected to each network interface for terminating low-level parts of a signaling protocol of the network architecture.

15. The switching interface of claim 8 wherein the network architecture is a digital loop carrier architecture and the combination of said switching system interface and said line/trunk interface is a remote terminal in said digital loop carrier architecture.

16. The switching interface of claim 8 further comprising one or more line/trunk management interfaces, compatible with internal signals used to operate said line/trunk interface.

17. The switching interface of claim 8 further comprising a call processing means communicating with a terminal of said network architecture said call processing means determining and controlling subscriber line states by operating said line/trunk interface.

18. A method of bypassing a common control and switch matrix of a first class five digital switching system in a telecommunications network, said method comprising the steps of:
accessing a first connection providing internal signals used to control line and trunk interfaces of the first digital switching system and convey data in and out of the line and trunk interfaces; and
applying a switching system interface, which is compatible with the first connection providing internal signals, to the first connection, the switching system interface bypassing at least a portion of the common control and switch matrix and being compatible with a digital transmission facility within the telecommunications network.

19. The method of bypassing a common control and switch matrix of claim 18 further comprising the step of method of establishing a second connection between the digital transmission facility and the switching system interface, thereby enabling the digital transmission facility to communicate with tho line and trunk interfaces through the switching system interface while bypassing at least a portion of the common control and switch matrix.

20. The method of bypassing a common control and switch matrix of claim 19 further comprising the steps of connecting a terminal within the telecommunications network to the second connection to enable the terminal to directly operate the line and trunk interfaces.

21. The method of bypassing a common control and switch matrix of claim 20 further comprising the steps of:
identifying dial-up internet calls dialed by subscribers connected to the line and trunk interfaces;

diverting identified dial-up Internet calls to a facility for handling internet traffic separate from the terminal.

22. The method of bypassing a common control and switch matrix of claim 21 wherein the step of identifying dial-up internet calls includes:
    providing a means within the switching system interface for capturing telephone numbers dialed by subscribers connected to the line and trunk interfaces;
    providing a memory for storing within the switching system interface a list of telephone numbers of known internet service providers; and
    providing a means within the switching system interface for comparing the telephone numbers dialed by the subscribers against the list in order to identify dial-up internet calls.

23. The method of bypassing a common control and switch matrix of claim 22 wherein the terminal is a remote terminal within a digital loop carrier architecture.

24. The method of bypassing a common control and switch matrix of claim 19 further comprising the steps of connecting a media gateway within the telecommunications network to the second connection to enable the media gateway to communicate with the internal signals.

25. The method of bypassing a common control and switch matrix of claim 18 wherein the step of applying a switching system interface includes:
    disconnecting at least one electronic circuit module located within the common control and switch matrix, the electronic circuit module providing a signaling function within the common control and switch matrix; and
    utilizing the switching system interface to perform the signaling function of the disconnected electronic circuit module.

26. The method of bypassing a common control and switch matrix of claim 18 wherein the step of applying a switching system interface includes augmenting, through the switching system interface, the common control and switch matrix in processing internal signaling functions with the line and trunk interfaces.

27. A switching system interface for bypassing the common control and switch matrix of a first class five digital switching system for telecommunications networks, comprising:
    a network interface for terminating a digital transmission facility within a network;
    means for connecting the network interface to at least one line/trunk interface of a digital switching system, the means for connecting the network interface to the line/trunk interface being compatible with a signaling protocol for communicating with the line/trunk interface; and
    means for connecting the network interface to a digital transmission facility within the telecommunications network, the means for connecting the network interface being compatible with a signaling protocol of the digital transmission facility;
    whereby the network interface bypasses at least a portion of the common control and switch matrix.

28. The switching system interface for bypassing the common control and switch matrix of claim 27 further comprising:
    means for identifying dial-up internet calls dialed by subscribers connected to the line/trunk interface; and
    means for diverting identified dial-up internet calls to a facility for handling internet traffic separate from the network interface.

* * * * *